US009002550B2

(12) United States Patent
Brennan et al.

(10) Patent No.: US 9,002,550 B2
(45) Date of Patent: Apr. 7, 2015

(54) USE OF TORQUE MODEL AT VIRTUAL ENGINE CONDITIONS

(75) Inventors: Daniel G. Brennan, Brighton, MI (US); Leonard G. Wozniak, Ann Arbor, MI (US); Robert C. Simon, Jr., Novi, MI (US); Jeffrey M. Kaiser, Highland, MI (US); Emil Ritzen, Sodertalje (SE); Mats A. Reimark, Bromma (SE); Richard M. Backman, Sodertalje (SE); Magnus Wall, Trollhattan (SE); Thomas Magnusson, Holo (SE)

(73) Assignee: GM Global Technology Operations LLC, Detroit, MI (US)

( * ) Notice: Subject to any disclaimer, the term of this patent is extended or adjusted under 35 U.S.C. 154(b) by 945 days.

(21) Appl. No.: 12/013,699

(22) Filed: Jan. 14, 2008

(65) Prior Publication Data

US 2009/0012665 A1    Jan. 8, 2009

Related U.S. Application Data

(60) Provisional application No. 60/947,575, filed on Jul. 2, 2007.

(51) Int. Cl.
| | |
|---|---|
| G06F 19/00 | (2011.01) |
| B60L 1/00 | (2006.01) |
| B60L 3/00 | (2006.01) |
| B60L 11/14 | (2006.01) |
| F02D 41/00 | (2006.01) |
| F02D 41/14 | (2006.01) |
| B60W 10/06 | (2006.01) |

(Continued)

(52) U.S. Cl.
CPC ............. *F02D 41/1406* (2013.01); *B60L 1/003* (2013.01); *B60L 3/0023* (2013.01); *B60L 11/14* (2013.01); *B60L 2220/14* (2013.01); *B60L 2240/441* (2013.01); *B60L 2240/443* (2013.01); *B60L 2240/662* (2013.01); *B60L 2260/44* (2013.01); *B60W 10/06* (2013.01); *B60W 10/08* (2013.01); *B60W 20/00* (2013.01); *B60W 2510/0657* (2013.01); *F02D 41/0002* (2013.01); *F02D 41/0065* (2013.01); *F02D 41/0087* (2013.01); *F02D 2200/1004* (2013.01); *F02D 2200/1006* (2013.01); *F02D 2250/18* (2013.01); *F02D 2250/26* (2013.01); *Y02T 10/42* (2013.01); *Y02T 10/6286* (2013.01); *Y02T 10/70* (2013.01); *Y02T 10/7077* (2013.01); *Y02T 10/7291* (2013.01); *Y02T 90/16* (2013.01); *Y10S 903/902* (2013.01)

(58) Field of Classification Search
USPC ........... 701/70, 84, 85, 86, 99, 101, 102, 104, 701/105, 108, 110; 60/605.1; 123/559.1, 123/90.15, 687, 676; 903/902
See application file for complete search history.

(56) References Cited

U.S. PATENT DOCUMENTS

| | | | | |
|---|---|---|---|---|
| 5,681,316 | A | * | 10/1997 | DeOrio et al. .................. 606/88 |
| 6,018,694 | A | * | 1/2000 | Egami et al. .................. 701/102 |

(Continued)

*Primary Examiner* — Ronnie Mancho (57) ABSTRACT

A torque estimation system for a vehicle comprises an operating parameter module, a torque estimation module, and an estimation control module. The operating parameter module determines an estimated engine operating parameter based on engine speed. The torque estimation module estimates engine torque based on the engine speed and the estimated engine operating parameter. The estimation control module provides a plurality of engine speeds to the operating parameter module and the torque estimation module to determine estimated engine torque as a function of engine speed.

24 Claims, 7 Drawing Sheets

(51) Int. Cl.
*B60W 10/08* (2006.01)
*B60W 20/00* (2006.01)

(56) References Cited

U.S. PATENT DOCUMENTS

| | | | |
|---|---|---|---|
| 6,278,915 B1 * | 8/2001 | Deguchi et al. | 701/22 |
| 6,349,293 B1 * | 2/2002 | Yamaguchi | 706/2 |
| 6,371,066 B1 * | 4/2002 | Cullen | 123/90.15 |
| 6,704,638 B2 | 3/2004 | Livshiz et al. | |
| 7,275,426 B2 * | 10/2007 | Lahti et al. | 73/114.32 |
| 7,305,950 B1 * | 12/2007 | Sinnamon | 123/90.17 |
| 7,765,795 B2 * | 8/2010 | Driscoll et al. | 60/285 |
| 2007/0010929 A1 * | 1/2007 | Takeda et al. | 701/82 |
| 2007/0125083 A1 * | 6/2007 | Rollinger et al. | 60/605.1 |

* cited by examiner

USE OF TORQUE MODEL AT VIRTUAL ENGINE CONDITIONS

CROSS-REFERENCE TO RELATED APPLICATIONS

This application claims the benefit of U.S. Provisional Application No. 60/947,575, filed on Jul. 2, 2007. The disclosure of the above application is incorporated herein by reference in its entirety.

FIELD

The present invention generally relates to creation and use of torque curves in a hybrid vehicle, and relates in particular to use of a torque model to create and update torque curves based on virtual engine conditions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid powertrains typically include a first torque generator, such as an internal combustion engine (ICE), and a second torque generator, such as an electric machine (EM). Each can provide torque to a driveline to propel a vehicle. Various configurations of hybrid powertrains can be used, including a strong hybrid powertrain and a mild hybrid powertrain. In a strong hybrid powertrain, the EM can drive the driveline directly, without transferring torque through a component of the ICE.

In a mild hybrid configuration, the EM is coupled with the ICE, such as through the front end accessory drive, whereby torque generated by the EM is transferred to the driveline through the ICE. An exemplary mild hybrid powertrain includes a belt alternator starter (BAS) system. In the BAS system, the EM is coupled to the ICE via a traditional belt and pulley configuration, which drives other accessory components including, but not limited to, pumps and compressors.

Powertrain torque control typically includes two torque control domains: axle torque and propulsion torque. In a mild hybrid powertrain, the propulsion torque is the output torque at the crankshaft of the ICE, which includes the EM torque contribution. Axle torque includes torque output from the driveline.

Powertrain systems include several torque features, each of which seeks to influence the amount of drive torque at various points along the powertrain system. The vehicle's driver, who commands a desired output torque from the torque source(s) or a desired axle torque, is an example of an upper level, or global, torque feature. Exemplary driver inputs include, but are not limited to, an accelerator pedal and a cruise control system.

Modern powertrain systems include additional torque features or torque requests such as vehicle stability control systems, traction control systems, engine overspeed protection systems, transmission shift quality systems, engine and/or transmission component protection systems, and/or driveline component protection systems. The torque features can number in the tens to over a hundred, depending upon the particular configuration of the powertrain system.

The torque features of a particular powertrain system are independent and can often seek to control the drive torque at the same time. Because the powertrain system can only produce a single drive torque value at any time, an arbitration system determines the correct drive torque to produce. A control module is typically provided for arbitrating the multiple torque requests. In a hybrid powertrain system, this control module is responsible for arbitrating torque requests for a plurality of torque generators (e.g., the ICE and EM).

SUMMARY

A torque estimation system for a vehicle comprises an operating parameter module, a torque estimation module, and an estimation control module. The operating parameter module determines an estimated engine operating parameter based on engine speed. The torque estimation module estimates engine torque based on the engine speed and the estimated engine operating parameter. The estimation control module provides a plurality of engine speeds to the operating parameter module and the torque estimation module to determine estimated engine torque as a function of engine speed.

In other features, the estimated engine operating parameter is at least one of air per cylinder and fuel per cylinder. The estimated engine operating parameter is air per cylinder (APC) and the operating parameter module selectively determines a minimum APC required at the engine speed. The minimum APC is based on at least one of minimum APC required for reliable throttle control, minimum APC required for reliable fuel injection, and minimum APC required for combustion stability. The minimum APC is determined by a maximum of the minimum APC required for reliable throttle control, the minimum APC required for reliable fuel injection, and the minimum APC required for combustion stability.

In further features, the operating parameter module determines the estimated engine operating parameter based on engine speed and operating mode. The operating mode is at least one of maximum torque, minimum engine running torque, and minimum engine off torque. The estimation control module provides the plurality of engine speeds to the operating parameter module and the torque estimation module for each of a plurality of the operating modes. The estimation control module provides the plurality of engine speeds to the operating parameter module and the torque estimation module for each of the operating modes. The operating parameter module determines a maximum value of the estimated engine operating parameter for the maximum torque mode.

In still other features, the estimation control module provides the plurality of engine speeds to the operating parameter module and the torque estimation module for a first number of cylinders being active and for a second number of cylinders being active. The vehicle includes an engine having N cylinders, the first number is equal to N, and the second number is equal to N divided by two. The torque estimation system further comprises a cam phaser position estimation module that estimates a cam phaser position based on the engine speed and the estimated engine operating parameter. The torque estimation module estimates engine torque based on the cam phaser position. The torque estimation system further comprises a spark advance estimation module that estimates spark advance based on the engine speed and the estimated engine operating parameter.

In other features, the torque estimation module estimates engine torque based on the spark advance. The torque estimation system further comprises an exhaust gas recirculation (EGR) estimation module that estimates opening of an EGR valve based on the engine speed and the estimated engine operating parameter. The torque estimation module estimates engine torque based on the EGR valve opening. The operating parameter module and the torque estimation module each comprise a reentrant function. The torque estimation system further comprises an engine control module that controls an internal combustion engine of the vehicle based upon the estimated engine torque. The torque estimation system further comprises a hybrid control module that controls an electric motor of the vehicle based upon the estimated engine torque.

A method for estimating torque in a vehicle comprises determining an estimated engine operating parameter based on engine speed; estimating engine torque based on the engine speed and the estimated engine operating parameter; and generating a plurality of engine speeds for the determining and the estimating to determine estimated engine torque as a function of engine speed.

In other features, the estimated engine operating parameter is at least one of air per cylinder and fuel per cylinder. The estimated engine operating parameter is air per cylinder (APC) and further comprises selectively determining a minimum APC required at the engine speed. The minimum APC is based on at least one of minimum APC required for reliable throttle control, minimum APC required for reliable fuel injection, and minimum APC required for combustion stability. The minimum APC is determined by a maximum of the minimum APC required for reliable throttle control, the minimum APC required for reliable fuel injection, and the minimum APC required for combustion stability.

In further features, the method further comprises determining the estimated engine operating parameter based on engine speed and operating mode. The operating mode is at least one of maximum torque, minimum engine running torque, and minimum engine off torque; and providing the plurality of engine speeds to the determining and the estimating for each of a plurality of the operating modes. The method further comprises providing the plurality of engine speeds to the determining and the estimating for each of the operating modes.

In still other features, the method further comprises determining a maximum value of the estimated engine operating parameter for the maximum torque mode. The method further comprises providing the plurality of engine speeds to the determining and the estimating for a first number of cylinders being active and for a second number of cylinders being active. The vehicle includes an engine having N cylinders, the first number is equal to N, and the second number is equal to N divided by two. The method further comprises estimating a cam phaser position based on the engine speed and the estimated engine operating parameter; and estimating engine torque based on the cam phaser position.

In other features, the method further comprises estimating spark advance based on the engine speed and the estimated engine operating parameter; and estimating engine torque based on the spark advance. The method further comprises estimating opening of an EGR valve based on the engine speed and the estimated engine operating parameter; estimating engine torque based on the EGR valve opening. The method further comprises controlling an internal combustion engine of the vehicle based upon the estimated engine torque. The method further comprises controlling an electric motor of the vehicle based upon the estimated engine torque.

Further areas of applicability of the present disclosure will become apparent from the detailed description provided hereinafter. It should be understood that the detailed description and specific examples are intended for purposes of illustration only and are not intended to limit the scope of the disclosure.

DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
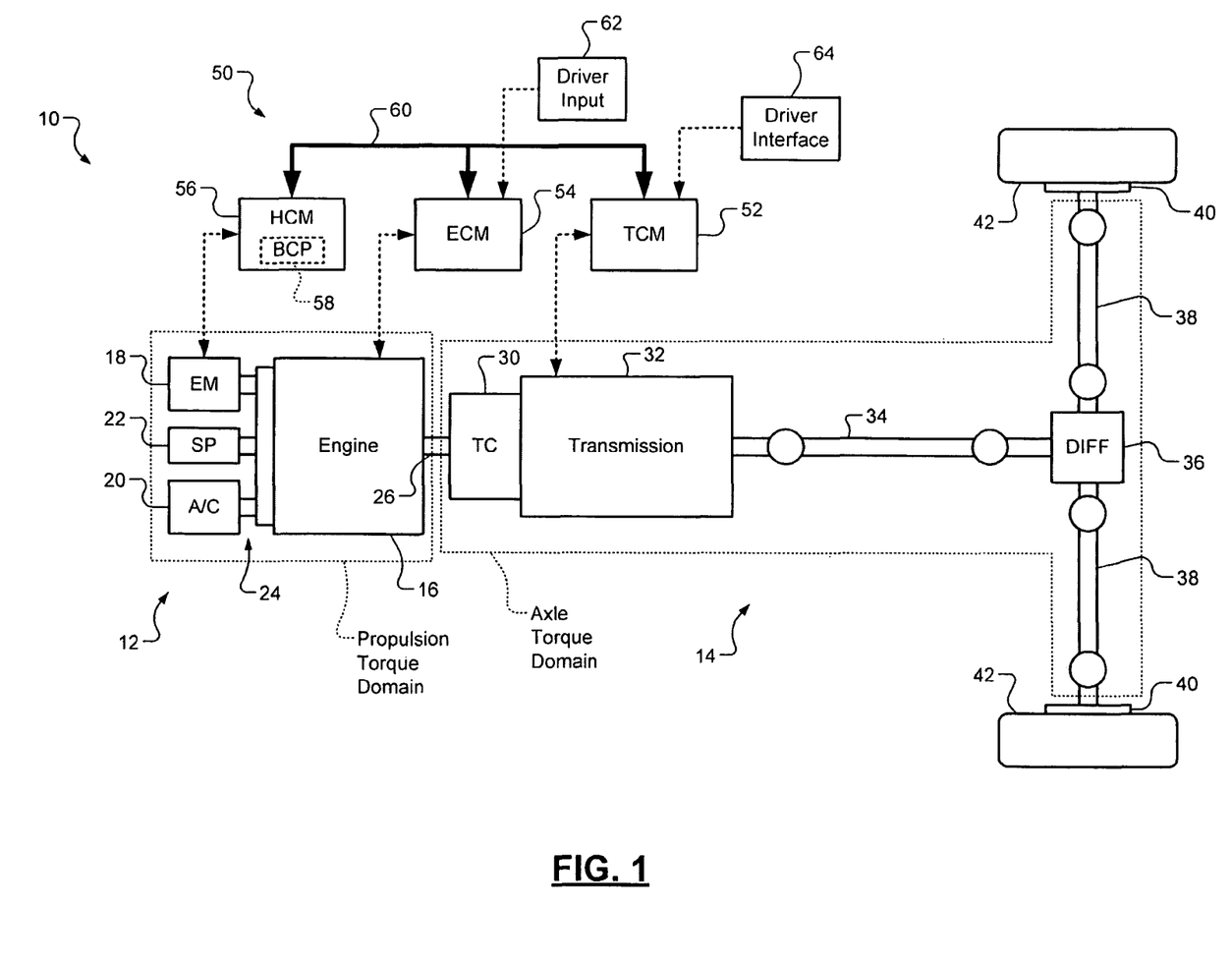
FIG. 1 is a functional block diagram of an exemplary hybrid powertrain system according to the principles of the present disclosure.

Referring now to FIG. 1, an exemplary hybrid powertrain 10 will be described in detail. Although the exemplary powertrain 10 is illustrated as a rear wheel drive (RWD) powertrain, the coordinated torque control of the present disclosure can be implemented with any other powertrain configuration. The exemplary powertrain 10 includes a propulsion system 12 and a driveline system 14. The propulsion system 12 includes an internal combustion engine (ICE) 16 and an electric machine (EM) 18. The propulsion system can also include auxiliary components including, but not limited to, an A/C compressor 20 and a steering pump 22.

The EM 18 and the auxiliary components (such as the A/C compressor 20 and the steering pump 22) are drivingly coupled to the ICE 16 using a belt and pulley system 24. The belt and pulley system 24 includes a plurality of pulleys that rotate together and interconnect the EM 18, the auxiliary components, and the crankshaft 26 of the ICE 16. The belt and pulley system 24 also includes a belt to enable torque to be transferred between the crankshaft 26 and the EM 18 and/or from the crankshaft 26 to the auxiliary components. This configuration is referred to as a belt alternator starter (BAS) system.

The crankshaft 26 of the ICE 16 drives the driveline system 14. The driveline system 14 includes a flexplate or flywheel (not shown), a torque converter or other coupling device 30, a transmission 32, a propeller shaft 34, a differential 36, axle shafts 38, brakes 40, and driven wheels 42. A propulsion torque ($T_{PROP}$) that is output at the crankshaft 26 of the ICE 16 is transferred through the driveline system components to provide an axle torque ($T_{AXLE}$) at the axle shafts 38 to drive the wheels 42.

More specifically, $T_{PROP}$ is multiplied by several ratios determined by the coupling device 30, the transmission 32, and the differential 36 to provide $T_{AXLE}$ at the axle shafts 38. Essentially, $T_{PROP}$ is multiplied by an effective gear ratio, which is a function of the ratios introduced by the coupling device 30, the transmission 32, the differential 36, and possibly other components. The other components are ones that introduce a ratio in the driveline system 14, such as a transfer case in a four-wheel-drive (4WD) or all-wheel-drive (AWD) powertrain. For the purposes of torque control, the $T_{AXLE}$ domain includes the ICE 16 and the EM 18.

The powertrain 10 also includes a control system 50, which regulates operation of the powertrain 10 based on the coordinated torque control of the present disclosure. The control system 50 includes a transmission control module (TCM) 52, an engine control module (ECM) 54 and a hybrid control module (HCM) 56. The HCM 56 includes one or more sub-modules, such as a BAS control processor (BCP) 58.

The TCM 52, ECM 54, and HCM 56 may communicate with one another via a controller area network (CAN) bus 60. A driver input 62 communicates with the ECM. The driver input 62 may include an accelerator pedal and/or a cruise control system. A driver interface 64 communicates with the TCM 52. The driver interface 64 may include a transmission range selector, such as a PRNDL lever.

Coordinated torque control facilitates component protection, engine overspeed prevention, and system remedial action, among other torque requests, in the ECM. Hybrid propulsion torque control in the HCM complements the ECM and may implement transmission torque control, regenerative braking, and engine overspeed prevention, among other torque requests.

The HCM may issue a torque request to set the engine torque to zero by deactivating the engine cylinders (e.g., by shutting off the fuel to the cylinders). This can occur during vehicle coast down situations when the accelerator pedal position is zero. For example, fuel is shut off and regenerative braking transfers the kinetic energy of the vehicle into electric power via the EM. To facilitate this, a torque converter clutch that links the axle torque to the crankshaft is engaged. Through this, the EM is driven.

Coordinated torque control for hybrid and traditional engines may rely on estimations of the engine's torque at operating points that the engine is not currently experiencing. These operating points may be defined in terms of, for example, speed, engine load, and combustion efficiency. Sensor inputs that identify the engine operating point may influence other inputs to a torque model of the ECM. Consequently, a series of functions may be called to create an array of synthesized inputs to be presented to the torque model.

These synthesized inputs can include air per cylinder (APC) and amount of opening of an exhaust gas recirculation (EGR) valve. For gasoline engines, these synthesized inputs can also include scheduled spark advance and scheduled cam position. For diesel engines, these synthesized inputs may include scheduled fuel delivery. The details of synthesizing the inputs for gasoline engines are described below in FIGS. 2-8.

The torque model of the ECM may be implemented in software and/or dedicated hardware that can calculate a torque based on various inputs. Such inputs may include air per cylinder (APC), spark advance, manifold absolute pressure (MAP), number of cylinders fueled, camshaft phaser position, engine RPM, and cylinder dilution (as a result of EGR). The model may include a calculation of the general form: Torque=a*APC+b*spark_advance+c*RPM . . . .

The coefficients a, b, c, etc. may be determined by regression analysis of measured torque data from engines run on a dynamometer or other controlled conditions. Additional details regarding an example of such a torque model can be found in U.S. Pat. No. 6,704,638 to Livshiz et al., entitled Torque Estimator for Engine RPM and Torque Control, the disclosure of which is incorporated by reference herein in its entirety.

With the exception of active fuel management (AFM), where the engine selectively deactivates cylinders, ECM software has only been used to calculate torque at the current engine RPM and current APC. The inputs to the model have therefore been a snapshot of current APC, current RPM, current spark advance, current phaser position, etc.

A strong hybrid system with an electrically variable transmission (EVT) allows the ICE operating point—its RPM and load (APC), and thus its torque—to be set relatively independently of vehicle speed and load. The torque demanded by the driver that is not supplied by the engine can be made up with the electric motors (EMs). Thus, creating algorithms that schedule the engine operating point based on various criteria can result in better fuel economy.

Further, engine and transmission control in a non-hybrid ICE may benefit from knowing engine torque as a function of RPM and number of active cylinders. For example, shift points may be selected to maximize fuel economy. In addition, cylinders may be deactivated at RPMs where resulting torque decreases will be minimal.

ICEs are generally most efficient at converting chemical energy (gasoline or diesel fuel) to mechanical energy at low RPMs and high loads (high APCs). This conversion efficiency is intuitive, in that friction losses from the rotating engine are lowest at the lowest RPMs, and pumping losses are minimal near wide open throttle (WOT) conditions (WOT produces high APC). So, to maximize fuel economy, the ICE can be run at near idle RPMs with the throttle wide open, or not run at all (fuel off, engine not spinning). However, there are limitations imposed by the EVT on how often the ICE can completely stop rotating.

It is the job of the optimizer in the hybrid control module (HCM) to select the best mix of EM torque and ICE torque that simultaneously meets the vehicle operator demand, while providing the best fuel economy and keeping the batteries charged. Regenerative braking alone may not be enough to keep the batteries charged in a strong hybrid. The hybrid optimizer can intelligently select and command the best engine operating point when the available range of engine off, minimum throttle (min APC), and maximum throttle (max APC) torque is available to it.

There is a gap between the torque produced when the engine is running at minimum throttle and the torque when the engine is off. The engine may not be able to produce a torque between these two values, at least for a given RPM. In other words, the achievable torque at a given RPM is discontinuous. Since the EVT allows the optimizer to set the engine's RPM as well as command the engine's throttle (APC), it needs to know these torques across a range of RPMs. Torque curve creation involves constructing an RPM axis of a calibratable number of points and sequentially feeding those points into the torque model.

Each torque curve may therefore include a torque corresponding to each RPM point along the RPM axis. Three torque curves may be produced—one for engine off, one for engine running with minimum throttle, and one for engine running with maximum throttle. These curves may be transmitted from the ECM to the HCM so that the HCM's optimizer will know what range of torques and RPMs are available from the ICE.

The torque curves sent from the ECM to the HCM may be one-dimensional, with torque dependent on a single RPM axis. The effects of spark advance, phaser position, EGR, etc. can be built into the curves by making calls to the scheduled spark advance, scheduled phaser position, scheduled EGR, etc. functions for the corresponding RPM. These functions can be written as reentrant (or as "algorithm libraries") so that calls can be made to them, at non-current engine operating points, from multiple operating system tasks.

Multiple sets of curves can be created for engines implementing active fuel management (AFM). For example, a first set of curves may be created corresponding to all cylinders being enabled, and a second set of curves may be created corresponding to half of the cylinders being enabled, resulting in a total of six curves. The values in these curves may change with ambient temperature, ambient air pressure, and length of drive cycle, so the curves may be periodically updated while the vehicle is running.

The HCM optimizer may analyze the state of battery charge (an approximation for how much torque the EMs can produce), how much torque the vehicle's operator is requesting, and how much torque can be achieved from the ICE based on the curves received. Based on this information, the HCM optimizer can determine a desired torque and RPM for the ICE. ICE RPM may be controlled through electric motor speed set points in the EVT. With the rotating synchronous field EMs in the EVT, the speed of the electric motors can be set independently of their torque, unlike fixed field DC or asynchronous AC EMs.

Figure 2:
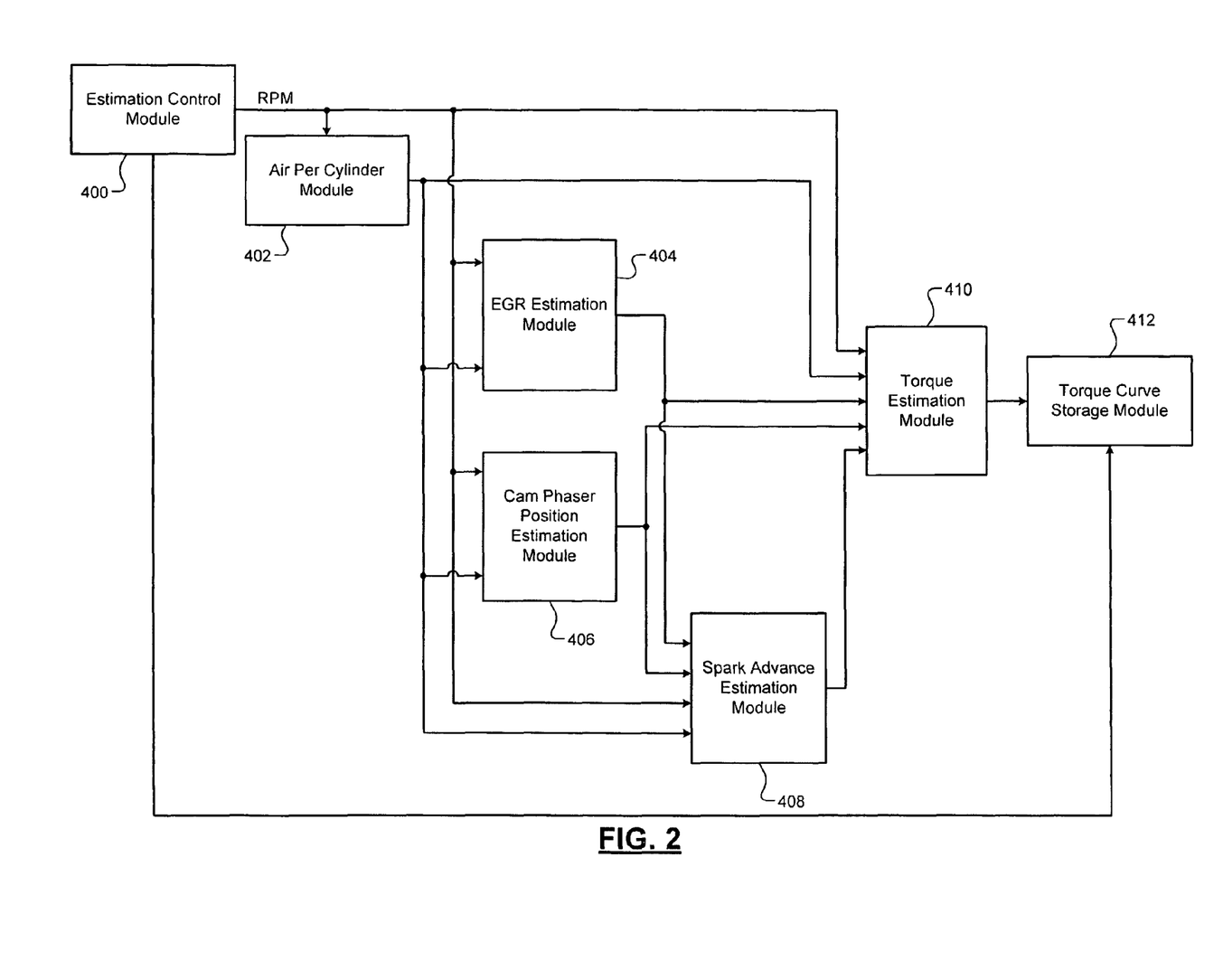
FIG. 2 is a functional block diagram illustrating a torque curve generation system according to the principles of the present disclosure.

Referring now to FIG. 2, a functional block diagram of a torque curve generation system is presented. An estimation control module 400 outputs a series of engine speed (RPM) values. This series of RPM values may range from an idle RPM to a redline RPM, and may be equally spaced. An air per cylinder (APC) module 402 determines an APC value for each RPM. The APC value is not actually being experienced by the engine (and therefore is called virtual), but is being predicted for a hypothetical (virtual) RPM that is supplied by the estimation control module 400.

An EGR estimation module 404, a cam phaser position estimation module 406, and a spark advance estimation module 408 estimate scheduled actuator positions at the selected RPM and APC. The spark advance estimation module 408 may also use the actuator positions from the EGR estimation module 404 and the cam phaser position estimation module 406.

Those scheduled actuator positions, along with RPM and APC, can then be passed to a torque estimation module 410 to estimate the torque at the RPM and APC. The torque estimation module 410 may implement a seven-term torque model, as described in more detail above. Output of the torque estimation module 410 may be stored in a torque curve storage module 412. The torque curve storage module 412 may be cleared by the estimation control module 400 when a new set of curves will be created. Alternatively, the torque curve storage module 412 may update each torque curve point as a new value is determined.

Torque curves as a function of RPM may be desired for maximum torque, minimum torque with the engine still running, and minimum torque with the engine off. To produce a minimum engine running torque curve, the APC module 402 can determine the minimum APC required for the engine to still be running at each RPM.

Maximum torque can be determined in a similar manner, except that the APC module 402 determines a maximum available APC. Further, the EGR valve may be assumed to be in an off position (i.e., 0% open) for maximum torque. The torque curve for absolute minimum torque (with the engine not running) may be determined with an almost-closed throttle to create the greatest vacuum against which the spinning engine must draw air.

The estimation modules 404-410 can be implemented as importable libraries so as to support reentrant functionality. Such reentrant functionality can ensure that the functions can be used by more than one task simultaneously without fear of data corruption. The estimation control module 400 and the APC module 402 may also be implemented as reentrant functions.

Values at each RPM point may be calculated for each of the three curves (maximum, minimum engine running, and minimum engine off). Alternatively, an entire curve may be calculated before the next curve is calculated. In addition, the set of three curves may be calculated for each cylinder configuration in active fuel management. Active fuel management may allow half of the cylinders to be shut off (by removing fuel and spark). Accordingly, the set of three curves may be calculated for all cylinders being active and also for only half of the cylinders being active.

For a diesel engine, the same types of maximum and minimum torque information can be used. However, the calculations may be different than for gasoline engines due to the difference in torque model, engine operating point determination, and engine operation point limitations/restrictions.

For example, minimum torque can be estimated by selecting an RPM point, then calculating the minimum fuel per cylinder for that RPM. This minimum fuel per cylinder and selected RPM point can then be sent to a reentrant torque estimation routine to determine an estimated min possible running torque.

Maximum torque can also be determined in a similar manner, but the maximum fuel delivery can be used in the torque model. The maximum fuel estimation may be based on maximum fuel pressure, maximum injector energizing time possible as a function of combustion stability, injector limitations, exhaust emissions limits, exhaust smoke limitation, and maximum air-charge for the selected RPM. This max fuel per cylinder and selected RPM point can then be sent to a reentrant torque estimation routine to determine an estimated max possible running torque.

Figure 3:
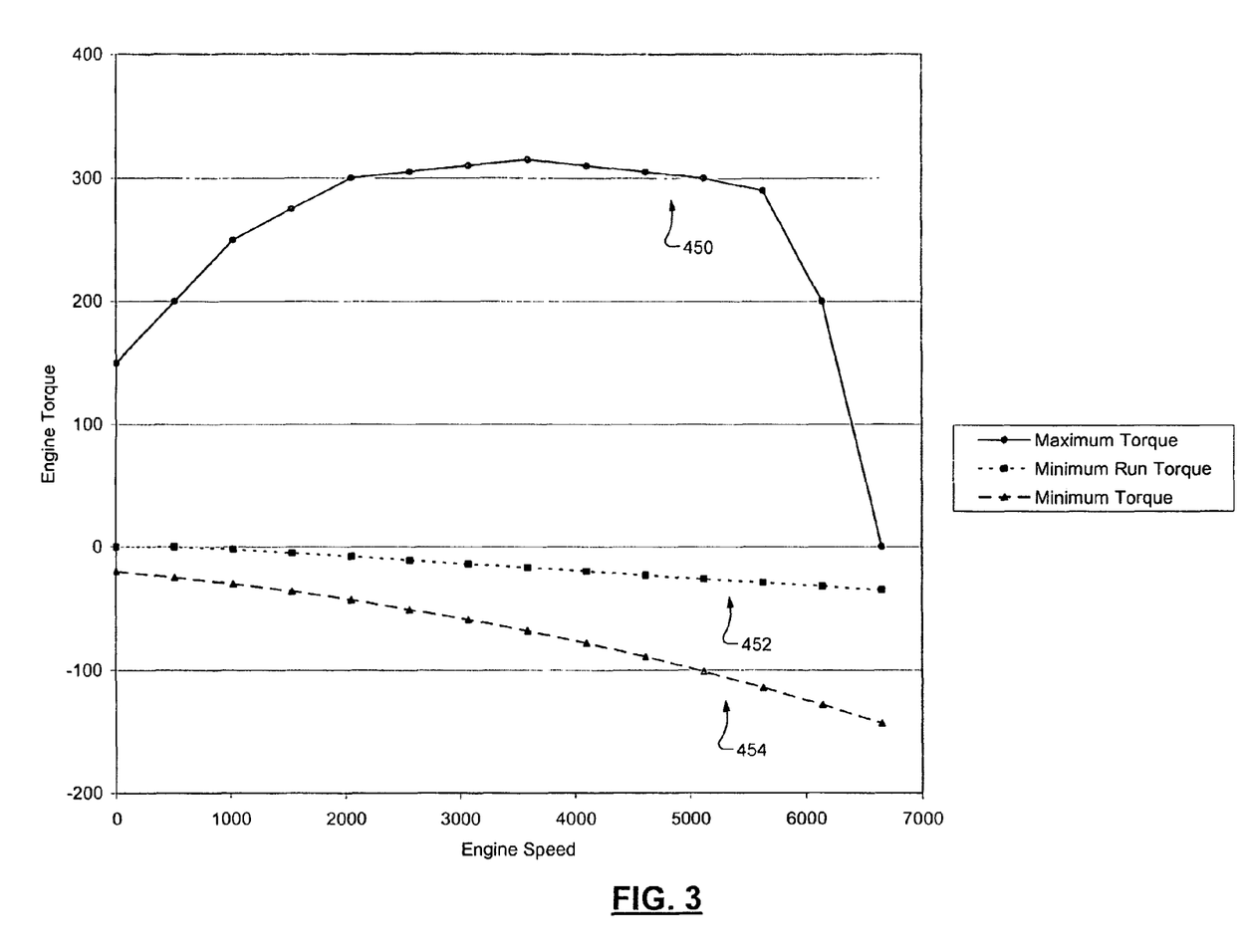
FIG. 3 is a graphical representation of a set of torque curves generated according to the principles of the present disclosure.

Referring now to FIG. 3, torque estimates can be assembled into torque curves such as a maximum predicted torque curve 450, a minimum running torque curve 452, and an engine off (or, minimum) torque curve 454. The maximum predicted torque curve provides an estimate of torque that would be produced at maximum airflow, current ambient conditions, and normal engine operating state across a range of RPMs.

The minimum running torque curve provides an estimate of torque that would be produced at minimum airflow, current ambient conditions, and normal engine operating state. The minimum torque curve provides an estimate of torque that would be produced at minimum airflow, fuel shutoff (engine not running), and current ambient conditions. In this case, it is equivalent to an estimate of the engine friction and pumping losses.

Figure 4:
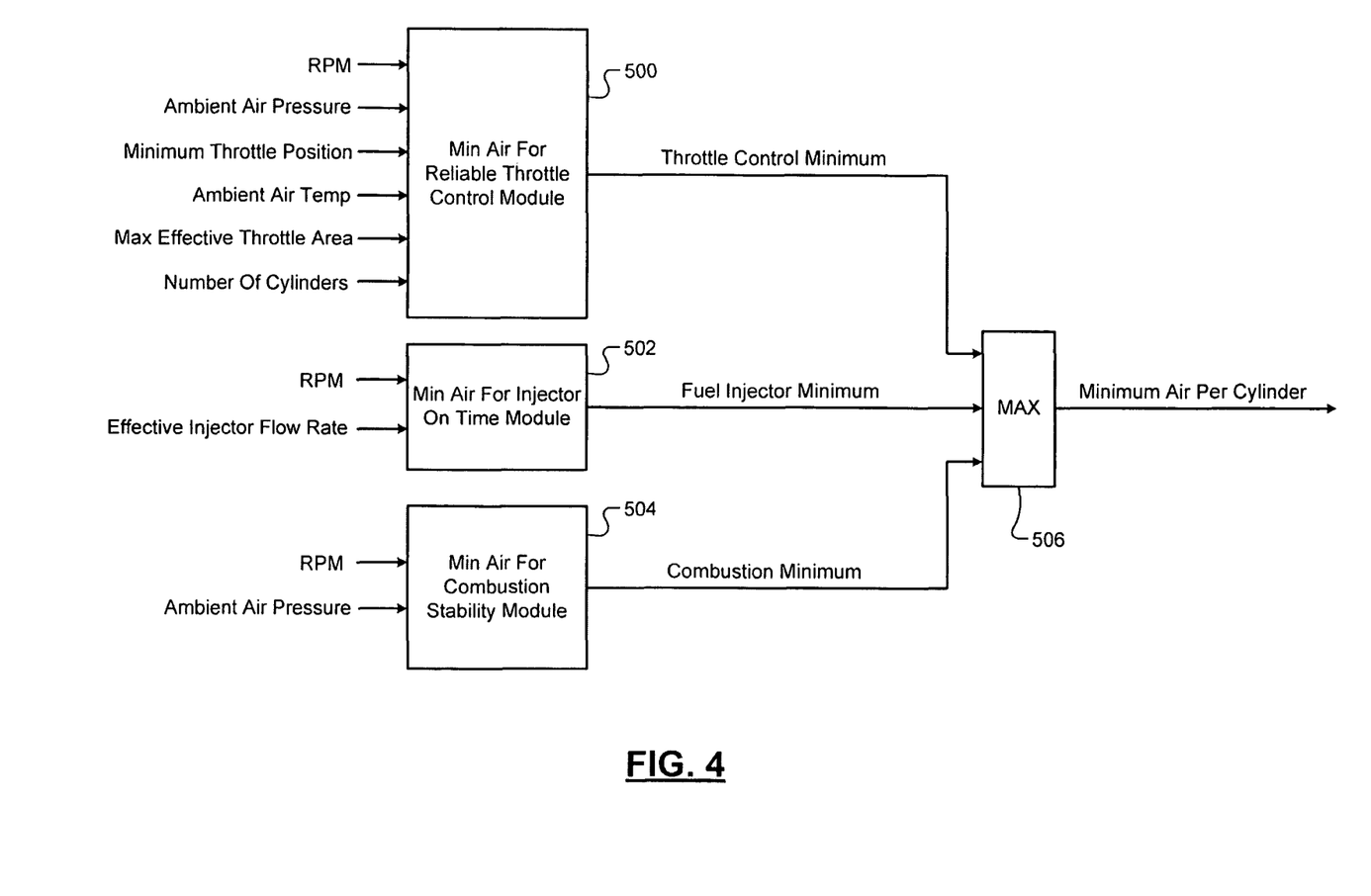
FIG. 4 is a functional block diagram illustrating calculation of minimum air per cylinder according to the principles of the present disclosure.

Referring now to FIG. 4, minimum torque can be estimated by selecting an RPM point, then calculating the minimum air per cylinder (APC) that is achievable. The system may look at three possible sources of the minimum APC achievable—minimum controllable throttle position, minimum consistent fuel injector on time, and minimum air density for self-sustaining combustion. The greatest of these three lower limits, as determined by a maximum module 506, provides the overall lower limit of the APC achievable.

Minimum APC required to maintain a controllable throttle position can be determined by a min air for reliable throttle control module 500. The min air for reliable throttle control module 500 can perform its calculation based on the following six inputs. The first is rotating engine speed in revolutions per minute (RPM). The second is barometric pressure, which may be referred to as ambient air pressure, and may be low-pass filtered.

The third is the minimum throttle position as a percentage of maximum position, i.e., wide-open throttle (WOT). Completely closing the throttle may cause it to become mechanically stuck in the throttle bore. A minimum throttle position calibration may therefore limit how completely closed the throttle can be. The fourth input is the temperature of the air outside of the vehicle. This temperature may be estimated from a fuel system temperature sensor operating under certain conditions instead of being read from a dedicated sensor.

The fifth is the maximum effective area of the throttle bore, in millimeters squared, when the throttle is wide open. This effective area may be a geometric measurement or may be inferred from an airflow measurement test that incorporates the throttle body discharge coefficient. The sixth is the number of cylinders in the engine, which may come from a calibration. Alternatively, the number of cylinders may change as selected cylinders are deactivated.

The fuel injectors may create another limit, in that they don't open and close instantaneously. Fuel injectors may have a minimum on time for which they must be driven; otherwise, they may effectively stay closed or may open to an indeterminable position. That minimum on time creates a minimum amount of fuel that can reliably be delivered into the cylinder. Since gasoline engines are typically run at a fixed air/fuel ratio, this minimum possible fuel delivered limit in turn creates a minimum APC limit.

Minimum air dictated by minimum injector on time can be determined by a min air for injector on time module 502. The min air for injector on time module 502 can perform its calculation based on engine RPM and the current effective injector flow rate in milligrams/second. The current effective injector flow rate may be a function of the pressure across the injector and the orifice size.

Another APC limit may result from the requirement of stable combustion. If fuel droplets are too widely spaced in the combustion chamber, there may not be enough heat transferred from the burning of one molecule to its neighbors to get self-sustaining combustion. In such a case, combustion starts at the spark plug but fails to ignite all the other droplets in the combustion chamber. The unburned fuel droplets then go out the exhaust port, and may damage the catalyst.

This limit is typically observed by calibrators using combustion quality measuring equipment as a wide variance in indicated mean effective pressure, which can be transformed into a coefficient of variance number, or COV. This limit may also be observed by monitoring the catalyst temperature in engines with catalyst temperature sensors. Catalyst temperatures start climbing when unburned fuel droplets reach the catalyst.

Minimum air required for acceptable combustion stability can be determined by a min air for combustion stability module 504. The min air for combustion stability module 504 can perform its calculation based on engine RPM and ambient air pressure.

The maximum of these three identified minimum APC limits can be used as the minimum APC for the minimum throttle torque calculations. If it is not known that one of these limits will always be the highest, various implementations may periodically recalculate only that limit which will be determinative.

For a diesel engine, the minimum fuel per cylinder can be calculated similarly. For example, minimum fuel per cylinder may be calculated based on the maximum of minimum fuel for controllable fuel pressure, minimum fuel for injector energizing time, and minimum fuel for acceptable combustion stability.

Figure 5:
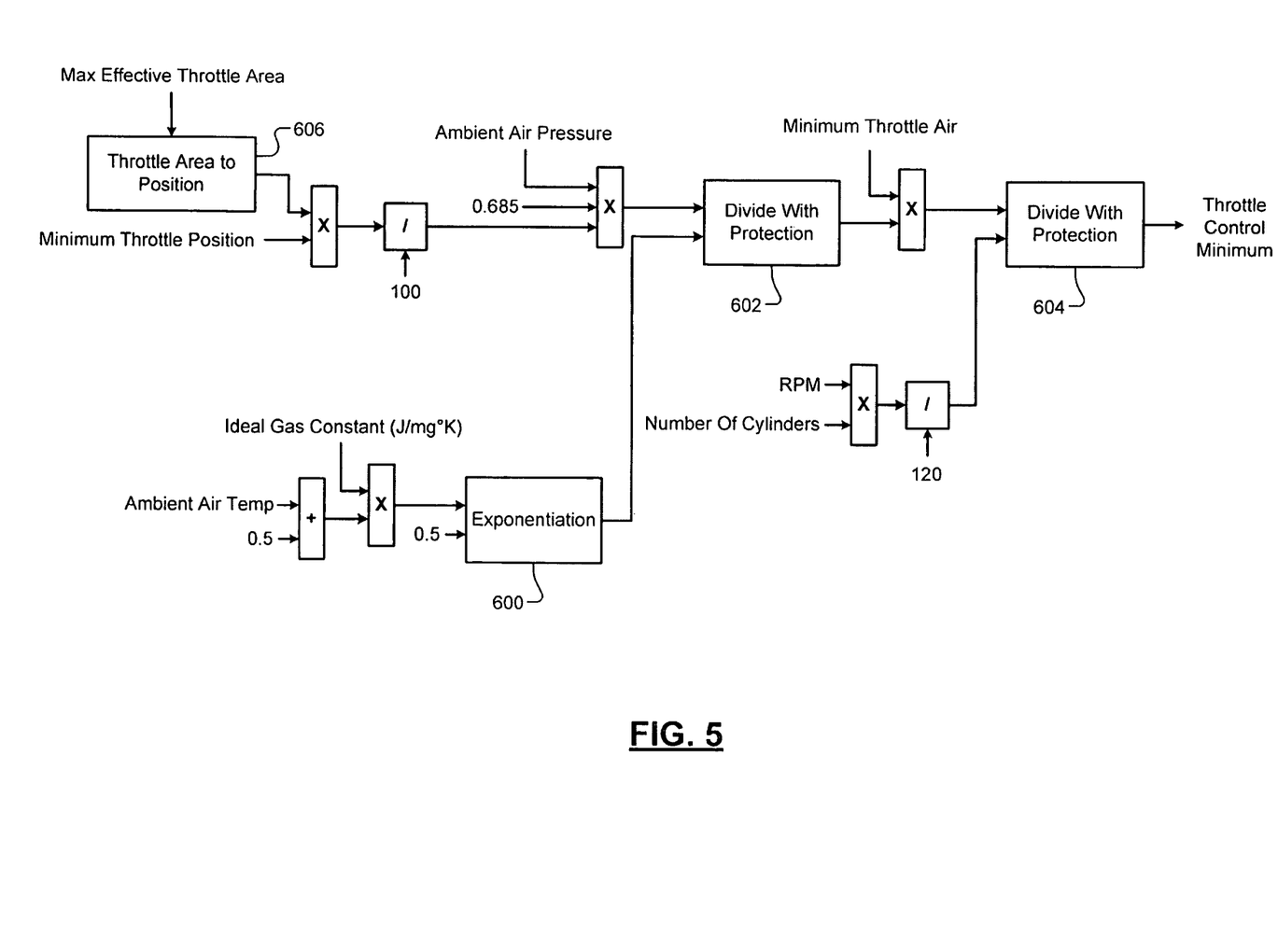
FIG. 5 is a functional block diagram illustrating calculation of minimum air for throttle control according to the principles of the present disclosure.

Referring now to FIG. 5, the minimum air for reliable throttle control may be calculated under the assumption that the air flow past a nearly closed throttle is always approximately sonic (mach 1). When airflow is sonic, the ratio of manifold absolute pressure (MAP) to inlet pressure is less than 0.528 (a constant for air). This assumption appears to be valid for engine speeds at idle or above.

However, when torque-controlled starts are implemented, using this assumption to set the desired torque during crank can be problematic because the crank can occur at RPMs much lower than idle RPMs. At these low RPMs, the airflow may go subsonic (where the pressure ratio of MAP to inlet pressure is greater than 0.528). As the engine spins slower and slower, the pressure in the intake manifold approaches the barometric pressure because manifold pressure and barometric pressure are equal when the engine is not spinning. The now incorrect sonic airflow assumption may end up calculating a very high minimum APC torque. As a result, the throttle might be prevented from closing as much as it should, which can cause engine RPM flares when the engine starts running.

One way to accommodate this potential problem is to determine minimum APC using only the fuel injector minimum and combustion minimum. Another way to prevent this problem is to create a table of MAPs at cranking RPMs, and use that table to determine if the air flow is sonic or subsonic. The minimum throttle APC calculation can then be adjusted accordingly. The subsonic flow equation can then be used when airflow is subsonic.

When airflow is sonic, it is possible to estimate the mass air flow rate as $(0.685 \times baro \times area)/(R \times T_{amb})^{0.5}$, where R is the ideal gas constant, $T_{amb}$ is ambient temperature, area is throttle area, and baro is barometric pressure. Module 600 may be a math library that raises a number to a power. For example, module 600 can raise an input to a power of 0.5, effectively taking a square root.

Modules 602 and 604 can perform a divide with a protection function that protects from dividing by zero. This function can be designed to avoid a divide by zero vector trap in order to avoid a program flow redirection that might result in missing fuel injection events, spark events, etc. The vehicle's driver might feel such a missed event as a stall or surge.

Thus, modules 602 and 604 may check for a zero divisor before attempting to execute a divide. If a zero divisor is found, the divisor can be changed to the smallest possible floating point number. In various implementations, if the numerator is a positive number, the output can be set to the smallest possible positive number. Alternatively or additionally, if the numerator is a negative number, the output can be set to the smallest possible negative number. Module 606 converts throttle area into throttle position, and may be implemented as a lookup table.

Figure 6:
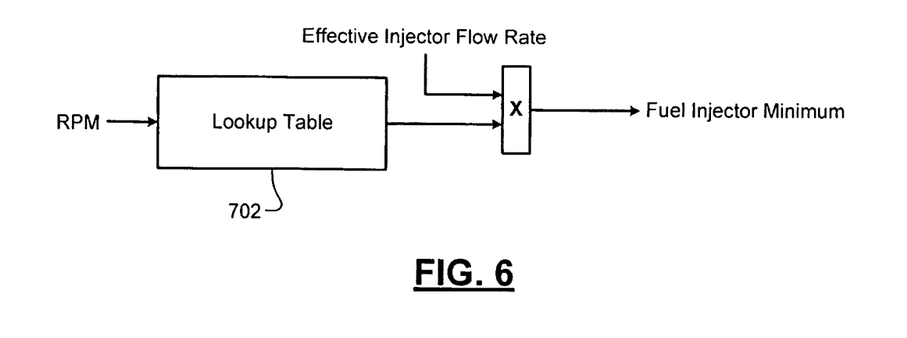
FIG. 6 is a functional block diagram illustrating calculation of minimum air for fuel injection control according to the principles of the present disclosure.

Referring now to FIG. 6, the minimum APC for reliable fuel injector actuation is determined. If the injectors are turned on for less than a minimum time, they may not fully open, and the amount of fuel delivered can be unpredictable. Lookup table 702 may include a value of minimum injector opening times as a function of RPM. The selected minimum injector opening time is then multiplied by the effective injector flow rate to reach the minimum APC for fuel injection.

Figure 7:
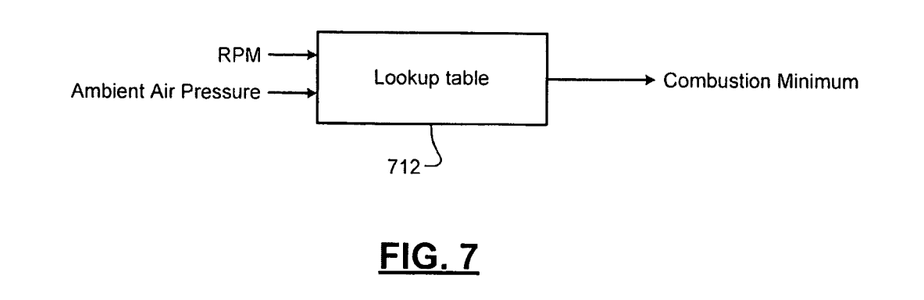
FIG. 7 is a functional block diagram illustrating calculation of minimum air for combustion stability according to the principles of the present disclosure.

Referring now to FIG. 7, minimum APC required for reliable combustion is determined. Lookup table 712 may include minimum allowed air per cylinder for reliable combustion as a function of RPM and barometric pressure.

Figure 8:
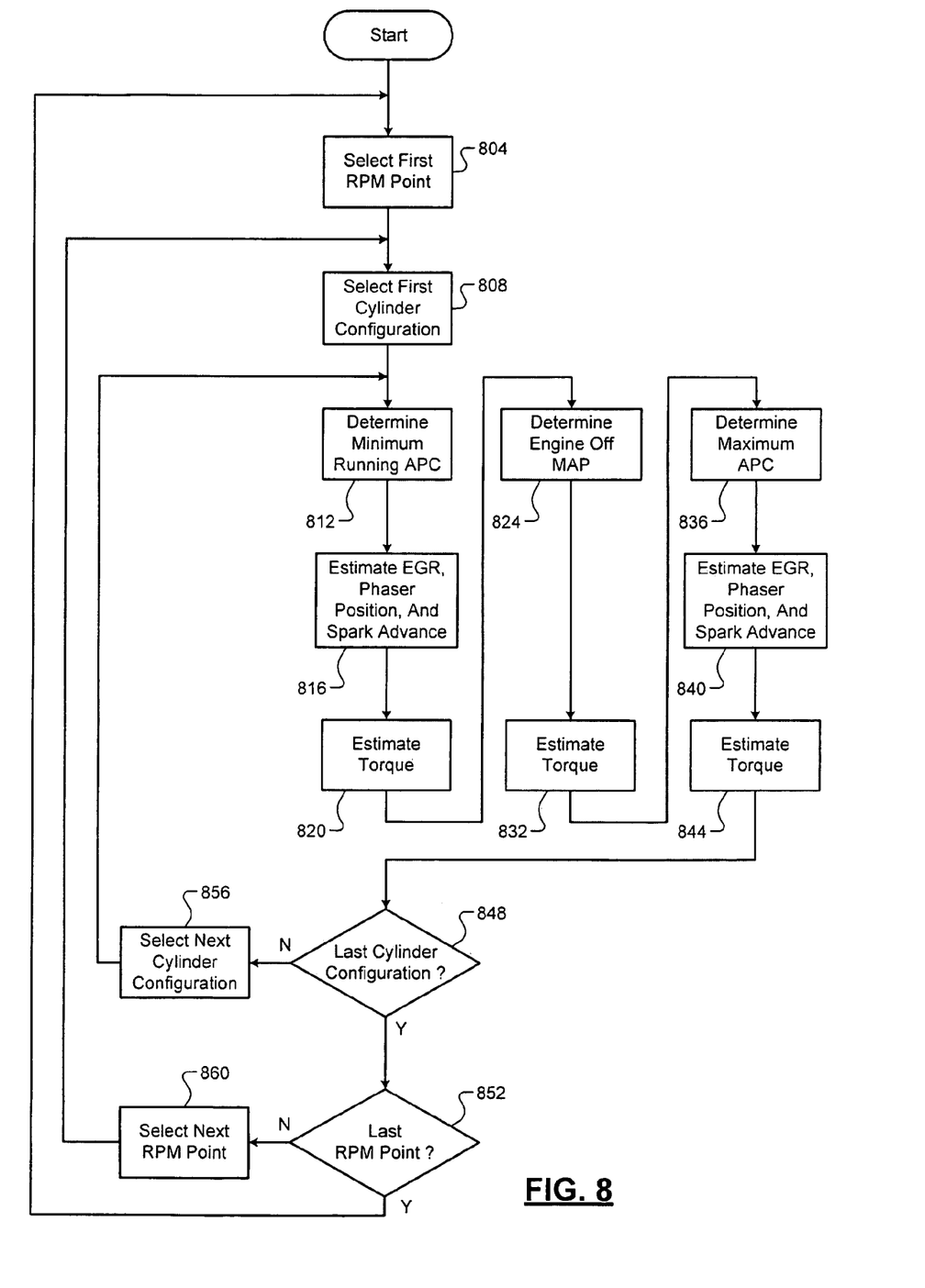
FIG. 8 is a flowchart illustrating exemplary steps taken in torque curve creation according to the principles of the present disclosure.

Referring now to FIG. 8, a flowchart depicts exemplary steps performed in generating predicted torque curves. The torque curves may be used by the ECM in a non-hybrid ICE to choose the best engine operating points for achieving current and future predicted torque. The torque curves may also be used by a hybrid control module to maximize the fuel efficiency of the ICE while using the EMs to provide the remainder of torque required.

The torque curves may be generated for a calibratable number of RPM points. The RPMs at which the torque curves are calculated may also be calibratable. Because the torque curves are not static for a given engine, the torque curves may be recalculated periodically. For example, the curves may vary based upon outside temperature, ambient air pressure, and length of the drive cycle.

For each RPM point, multiple torque values may be determined. For example, a torque value corresponding to minimum torque produced by the engine with the engine still running can be calculated. In addition, the minimum torque produced by the engine when the engine is not running can be determined. Both of these values may actually be negative due to friction and pumping losses.

A torque value can also be calculated for the maximum torque possible at the RPM point. This produces three curves, such as the ones shown in FIG. 3. For a given RPM, the engine can produce a torque between the minimum running torque and the maximum torque, or the engine can produce the minimum engine off torque. The engine may not be able to produce torques between the minimum running torque and the minimum engine off torque.

Calculation of the torque values for the torque curves can be performed by the same functions or modules used by the ECM in calculating torque for the current engine operating point. The functions may be implemented as reentrant so that they can be called by the torque curve estimation logic of FIG. 4 as well as other modules of the ECM without fear of data corruption.

The ICE may support active fuel management (AFM), which deactivates selected cylinders of the engine. The torque curves may be calculated for each set of cylinders that can be active. For example, the torque curves may be calculated for all cylinders being active and for half of the cylinders being active.

Control begins in step 804, where the first RPM point of the torque curves to be calculated is selected. Control continues in step 808, where the first cylinder configuration is selected. For example, the first cylinder configuration may be all cylinders active. Control continues in step 812, where the minimum air per cylinder (APC) for a running engine is calculated.

Control continues in step 816, where position of the exhaust gas recirculation (EGR) valve, phaser position, and spark advance are calculated for the selected RPM and the calculated APC. Control continues in step 820, where a torque model estimates torque based upon the EGR position, phaser position, spark advance, APC, and RPM.

Control continues in step 824, where manifold absolute pressure (MAP) for the engine off state is determined. Control continues in step 832, where an engine off torque is estimated. The engine off torque may include pumping losses determine based upon the estimated MAP and frictional losses determined based upon engine speed in RPM.

Control continues in step 836, where the maximum APC possible is determined. Control continues in step 840, where EGR position, phaser position, and spark advance are determined. For example only, the EGR position for maximum APC may be no EGR contribution (EGR valve fully closed). Control continues in step 844, where torque is estimated for the maximum APC.

Control continues in step 848, where control determines whether the selected cylinder configuration is the last cylinder configuration. If so, control transfers to step 852; otherwise, control transfers to step 856. In step 856, the next cylinder configuration is selected and control returns to step 812. For example only, the next cylinder configuration may be half of the cylinders being active.

In step 852, control determines whether the last RPM point in the torque curve is selected. If so, control returns to step 804 and begins calculating a new series of torque curves. Otherwise, control transfers to step 860. In step 860, the next RPM point is selected and control returns to step 808. The process of calculating torque curves may continue for as long as the car is running.

To prevent overburdening a processor, such as a processor in the ECM, torque curve calculation may not be continuous. For example, the torque curves may be calculated at the beginning of every time interval of a predetermined length. For example only, torque curves may be calculated at the beginning of every 10 second window.

Alternatively, the torque curves may be calculated in sections. For example, one or two RPM points may be calculated before the control of FIG. 8 relinquishes the processor to other tasks. For example only, control may calculate torques corresponding to a single RPM point and then wait for 17 milliseconds to allow other tasks to be executed on the processor.

The method of FIG. 8 can be easily adapted for diesel engines. For example, steps 812, 824, and 836 may be adapted to determine minimum fuel per cylinder. The EGR position, phaser position, spark advance, and torque can then be estimated in steps 816, 820, 828, 832, 840, and 844 based on those determined fuel per cylinder values.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A torque estimation system for a vehicle, comprising:
   an estimation control module that selectively outputs a first engine speed and a second engine speed;

an operating parameter module that determines a first set of M estimated engine operating parameters based on the first engine speed and that determines a second set of the M estimated engine operating parameters based on the second engine speed, wherein M is an integer greater than one;

a torque estimation module that estimates a first set of M engine torques based on the first set of M estimated engine operating parameters, respectively, and the first engine speed and that estimates a second set of M engine torques based on the second set of M estimated engine operating parameters, respectively, and the second engine speed; and a hybrid control module that controls an electric motor of the vehicle based upon the first and second sets of M engine torques.

2. The torque estimation system of claim 1 wherein the operating parameter module determines at least one of air per cylinder and fuel per cylinder.

3. The torque estimation system of claim 1 wherein the operating parameter module determines a first minimum air per cylinder (APC) required at the first engine speed and determines a second minimum APC required at the second engine speed.

4. The torque estimation system of claim 3 wherein the operating parameter module:
determines a third minimum APC required for reliable throttle control for the first engine speed, a fourth minimum APC required for reliable fuel injection for the first engine speed, and a fifth minimum APC required for combustion stability for the first engine speed;
determines the first minimum APC based on one of the third, fourth, and fifth minimum APCs;
determines a sixth minimum APC required for reliable throttle control for the second engine speed, a seventh minimum APC required for reliable fuel injection for the second engine speed, and an eighth minimum APC required for combustion stability for the second engine speed; and
determines the second minimum APC based on one of the sixth, seventh, and eighth minimum APCs.

5. The torque estimation system of claim 4 wherein the operating parameter module:
determines the first minimum APC based on a maximum one of the third, fourth, and fifth minimum APCs; and
determines the second minimum APC based on a maximum one of the sixth, seventh, and eighth minimum APCs.

6. The torque estimation system of claim 1 wherein the operating parameter module determines a first maximum air per cylinder (APC) at the first engine speed and determines a second maximum APC at the second engine speed.

7. The torque estimation system of claim 1 wherein:
the operating parameter module further determines a third set of the M estimated engine operating parameters based on the first engine speed and a first number of cylinders of an engine being active and determines a fourth set of the M estimated engine operating parameters based on the second engine speed and a second number of cylinders of the engine being active; and
the torque estimation module further estimates a third set of M engine torques based on the third set of M estimated engine operating parameters, respectively, and the first engine speed and that estimates a fourth set of M engine torques based on the fourth set of M estimated engine operating parameters, respectively, and the second engine speed.

8. The torque estimation system of claim 7 wherein said engine includes a total of N cylinders, said first number is equal to N, and said second number is equal to N divided by two.

9. The torque estimation system of claim 1 further comprising a cam phaser position estimation module that estimates a first set of M cam phaser positions based on the first set of M estimated engine operating parameters, respectively, and the first engine speed, and that estimates a second set of M cam phaser positions based on the second set of M estimated engine operating parameters, respectively, and the second engine speed,
wherein the torque estimation module estimates the first set of M engine torques further based on the first set of M cam phaser positions, respectively, and
wherein the torque estimation module estimates the second set of M engine torques further based on the second set of M cam phaser positions, respectively.

10. The torque estimation system of claim 1 further comprising a spark advance estimation module that estimates a first set of M spark advance values based on the first set of M estimated engine operating parameters, respectively, and the first engine speed, and that estimates a second set of M spark advance values based on the second set of M estimated engine operating parameters, respectively, and the second engine speed,
wherein the torque estimation module estimates the first set of M engine torques further based on the first set of M spark advance values, respectively, and
wherein the torque estimation module estimates the second set of M engine torques further based on the second set of M spark advance values, respectively.

11. The torque estimation system of claim 1 further comprising exhaust gas recirculation (EGR) estimation module that estimates a first set of M openings of an EGR valve based on the first set of M estimated engine operating parameters, respectively, and the first engine speed, and that estimates a second set of M openings of the EGR valve based on the second set of M estimated engine operating parameters, respectively, and the second engine speed,
wherein the torque estimation module estimates the first set of M engine torques further based on the first set of M openings of the EGR valve, respectively, and
wherein the torque estimation module estimates the second set of M engine torques further based on the second set of M openings of the EGR valve, respectively.

12. The torque estimation system of claim 1 further comprising an engine control module that controls an internal combustion engine of said vehicle based upon the first and second sets of M engine torques.

13. A torque estimation method for a vehicle, comprising:
selectively outputting a first engine speed and a second engine speed;
determining a first set of M estimated engine operating parameters based on the first engine speed, wherein M is an integer greater than one;
determining a second set of the M estimated engine operating parameters based on the second engine speed;
estimating a first set of M engine torques based on the first set of M estimated engine operating parameters, respectively, and the first engine speed;
estimating a second set of M engine torques based on the second set of M estimated engine operating parameters, respectively, and the second engine speed; and
controlling an electric motor of the vehicle based upon the first and second sets of M engine torques.

14. The torque estimation method of claim 13 wherein the first and second sets of M estimated engine operating parameters each include at least one of air per cylinder and fuel per cylinder.

15. The torque estimation method of claim 13 wherein:
determining the first set of the M estimated engine operating parameters includes determining a first minimum air per cylinder (APC) required at the first engine speed; and
determining the second set of the M estimated engine operating parameters includes determining a second minimum APC required at the second engine speed.

16. The torque estimation method of claim 15 further comprising:
determining a third minimum APC required for reliable throttle control for the first engine speed, a fourth minimum APC required for reliable fuel injection for the first engine speed, and a fifth minimum APC required for combustion stability for the first engine speed;
determining the first minimum APC based on one of the third, fourth, and fifth minimum APCs;
determining a sixth minimum APC required for reliable throttle control for the second engine speed, a seventh minimum APC required for reliable fuel injection for the second engine speed, and an eighth minimum APC required for combustion stability for the second engine speed; and
determining the second minimum APC based on one of the sixth, seventh, and eighth minimum APCs.

17. The torque estimation method of claim 16 further comprising:
determining the first minimum APC based on a maximum one of the third, fourth, and fifth minimum APCs; and
determining the second minimum APC based on a maximum one of the sixth, seventh, and eighth minimum APCs.

18. The torque estimation method of claim 13 wherein:
determining the first set of the M estimated engine operating parameters includes determining a first maximum air per cylinder (APC) at the first engine speed; and
determining the second set of the M estimated engine operating parameters includes determining a second maximum APC at the second engine speed.

19. The torque estimation method of claim 13 further comprising:
determining a third set of the M estimated engine operating parameters based on the first engine speed and a first number of cylinders of an engine being active;
determining a fourth set of the M estimated engine operating parameters based on the second engine speed and a second number of cylinders of the engine being active;
estimating a third set of M engine torques based on the third set of M estimated engine operating parameters, respectively, and the first engine speed; and
estimating a fourth set of M engine torques based on the fourth set of M estimated engine operating parameters, respectively, and the second engine speed.

20. The torque estimation method of claim 19 wherein said engine includes a total of N cylinders, said first number is equal to N, and said second number is equal to N divided by two.

21. The torque estimation method of claim 13 further comprising:
estimating a first set of M cam phaser positions based on the first set of M estimated engine operating parameters, respectively, and the first engine speed;
estimating a second set of M cam phaser positions based on the second set of M estimated engine operating parameters, respectively, and the second engine speed;
estimating the first set of M engine torques further based on the first set of M cam phaser positions, respectively; and
estimating the second set of M engine torques further based on the second set of M cam phaser positions, respectively.

22. The torque estimation method of claim 13 further comprising:
estimating a first set of M spark advance values based on the first set of M estimated engine operating parameters, respectively, and the first engine speed;
estimating a second set of M spark advance values based on the second set of M estimated engine operating parameters, respectively, and the second engine speed;
estimating the first set of M engine torques further based on the first set of M spark advance values, respectively; and
estimating the second set of M engine torques further based on the second set of M spark advance values, respectively.

23. The torque estimation method of claim 13 further comprising:
estimating a first set of M openings of an exhaust gas recirculation (EGR) valve based on the first set of M estimated engine operating parameters, respectively, and the first engine speed;
estimating a second set of M openings of the EGR valve based on the second set of M estimated engine operating parameters, respectively, and the second engine speed;
estimating the first set of M engine torques further based on the first set of M openings of the EGR valve, respectively; and
estimating the second set of M engine torques further based on the second set of M openings of the EGR valve, respectively.

24. The torque estimation method of claim 13 further comprising controlling an internal combustion engine of said vehicle based upon the first and second sets of M engine torques.

* * * * *